(No Model.)
N. J. NILSON.
HORSE HAY FORK.
No. 347,253. Patented Aug. 10, 1886.
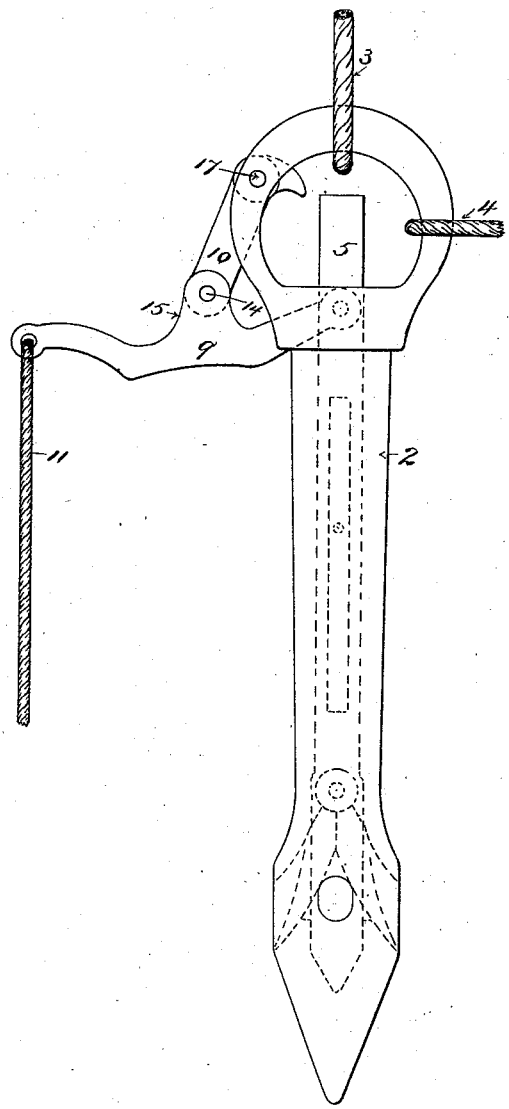
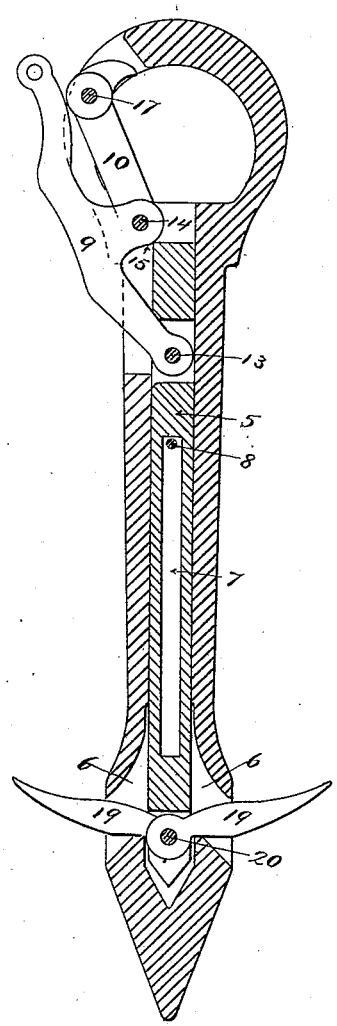
Witnesses
Inventor

UNITED STATES PATENT OFFICE.

NILS J. NILSON, OF MERIDIAN, WISCONSIN.

HORSE HAY-FORK.

SPECIFICATION forming part of Letters Patent No. 347,253, dated August 10, 1886.

Application filed March 22, 1886. Serial No. 196,065. (No model.)

*To all whom it may concern:*

Be it known that I, NILS J. NILSON, of Meridian, in the county of Dunn and State of Wisconsin, have invented certain new and useful Improvements in Horse Hay-Forks, of which the following is a specification.

My invention relates to improvements in what are known as "horse hay-forks" and it consists, generally, in the construction and combination hereinafter described, and particularly pointed out in the claim.

In the drawings forming part of this specification, Figure 1 is a side elevation of my improved fork in position ready to be inserted into the material. Fig. 2 is a longitudinal vertical section showing the tines extended.

2 represents the outer casing, preferably made in two sections and bolted or otherwise fastened together. This casing is provided at its upper extremity with an eye which receives the lifting-rope 3 and the guide-rope 4, and its lower end is pointed and provided with the curved slots or openings 6.

5 is a slide inclosed within the casing 2, and free to move vertically therein. This slide is provided with the slot 7, through which the bolt or pin 8 passes.

9 is a lever, the inner end of which is attached to the upper part of the slide 5 by means of the pin 13. The outer end of this lever receives the operating-rope 11.

15 is a projection raised above the lever, as shown in the drawings, to which is pivoted the link 10 by the pin 14. The link 10 swings vertically in a recess in the casing 2, and is pivotally secured to the said casing by the pin 17.

19 19 are tines hinged in a slot or opening at the lower extremity of the slide 5, to which they are secured by the pin 20. It will be seen that when the slide is raised, as shown in Fig. 1, the tines rest in the curved slots 6, and the implement is easily inserted into the material. When a sufficient depth has been reached, the lever 9 is forced upward to the position shown in Fig. 2, which carries the slide 5 downward in the casing, and the tines following the curved slots 6 are forced into a horizontal position, the fulcrum 15 on the lever 9 and the end of the link 10, to which it is attached, pass beyond the dead-center, between the pins 13 and 17, as shown in Fig. 2, and thereby lock or hold the slide fixed in its position against the resistance of the material upon the tines until the lever 9 is again forced back to its original position by means of the rope 11, when the tines are drawn into the casing and the material released.

What I claim is—

The combination, in a hay fork, with the casing 2, having the slots 6, of the slide 5, the tines 19, hinged thereto, the lever 9, pivoted to said slide, and the link 10, pivoted at 17 to the upper portion of the casing and pivoted to a projection, 15, on the lever 9, substantially as described, and for the purpose set forth.

In testimony whereof I have hereunto set my hand this 12th day of March, 1886.

NILS J. NILSON.

In presence of—
GEO. H. CHAMBERLIN,
JOHN M. SIGLER.